United States Patent
Ono et al.

(10) Patent No.: US 6,565,771 B1
(45) Date of Patent: May 20, 2003

(54) PROCESS FOR PRODUCING ALUMINATE-BASED PHOSPHOR

(75) Inventors: Keiji Ono, Tsukuba (JP); Susumu Miyazaki, Fujishiro-machi (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/677,769

(22) Filed: Oct. 3, 2000

(30) Foreign Application Priority Data

| Oct. 6, 1999 | (JP) | 11-285400 |
| Oct. 6, 1999 | (JP) | 11-285401 |
| Nov. 30, 1999 | (JP) | 11-339871 |
| Nov. 30, 1999 | (JP) | 11-339872 |

(51) Int. Cl.$^7$ .............................................. C09K 11/64
(52) U.S. Cl. .............................................. 252/301.4 R
(58) Field of Search ................... 252/301.4 R

(56) References Cited

U.S. PATENT DOCUMENTS 4,818,433 A * 4/1989 Sigai et al. ............ 252/301.4 R
5,169,557 A    12/1992 Sigai et al.
6,197,218 B1 * 3/2001 Hampden-Smith et al. ...... 252/301.36

OTHER PUBLICATIONS

JP 11 140438 A, May 25, 1999, Derwent Publications Ltd., London, GB; AN 1999–374575, XP002184159 &.

* cited by examiner

Primary Examiner—C. Melissa Koslow
(74) Attorney, Agent, or Firm—Sughrue Mion, PLLC

(57) ABSTRACT

The present invention provides a method for producing an aluminate-based phosphor or a luminescent aluminate-based phosphor, which comprises calcining an aluminum compound having a BET specific surface area of 100 $m^2/g$ or more.

23 Claims, No Drawings

PROCESS FOR PRODUCING ALUMINATE-BASED PHOSPHOR

TECHNICAL FIELD OF THE INVENTION

The present relates to a method for producing an aluminate-based phosphor. More particularly, the present invention relates to a method for producing an aluminate-based phosphor having extremely uniform cation composition, used for various displays of emitting type such as a plasma display panel (PDP) and the like.

Further, the present invention relates to a method for producing a luminescent aluminate-based phosphor. More particularly, the present invention relates to a method for producing a luminescent aluminate-based phosphor used for a luminous material which is excited by ultraviolet and visible lights to show afterglow property for a long period of time, and the like.

BACKGROUND OF THE INVENTION

Recently, there are investigations of an aluminate-based phosphor which is excited by a vacuum ultraviolet ray and the like radiated by rare gas discharge, to emit lights. For example, there are known $BaMgAl_{10}O_{17}$:Eu, $BaMgAl_{14}O_{23}$:Eu and the like as a blue light emitting phosphor, and $BaAl_{12}O_{19}$:Mn, $BaMgAl_{14}O_{23}$:Mn and the like as a green light emitting phosphor.

For example, a blue phosphor ($BaMgAl_{10}O_{17}$:Eu, $BaMgAl_{14}O_{23}$:Eu and the like) can be produced by preparing a mixture of 1) a barium compound, 2) an europium compound, 3) a magnesium compound and 4) an aluminum compound as raw materials and calcining, in a weak reductive atmosphere, the mixture as a precursor.

In this method, however, solid compounds of respective constituent ions are used as raw materials and mixing thereof is conducted by physical mixing such as ball mixing and the like, this precursor obtained by physical mixing such as ball milling and the like reveals poor dispersion of constituent ions, barium ion, europium ion, magnesium ion, aluminum ion and the like, and a blue phosphor after calcination does not easily obtain uniform composition. When dispersion of constituent ion is poor, particularly when dispersion of an europium ion acting as light emitting center is poor, portions of higher concentration of europium emerge locally, causing reduction in emitting brilliance which is called concentration quench.

Consequently, for obtaining a phosphor having excellent emitting efficiency, it has been desired to obtain a phosphor precursor in which dispersion of constituent ions is more excellent and to produce a phosphor having a uniform composition from said precursor.

On the other hand, there are conventionally used, as a luminescent phosphor, self emitting nocturnally luminous paints obtained by adding a radioative substance to a phosphor, for a night display or a nocturnal clock. Recently, there are wide investigations on application of a luminescent phosphor containing no radioative substance which shows afterglow property for a long period of time. As the luminescent phosphor, for example, europium-activated strontium aluminate ($SrAl_2O_4$:Eu and the like) is mainly investigated.

It is well known that the property of a phosphor is influenced by dispersibility of constituent ions of the phosphor, and the light emitting efficiency becomes higher when dispersibility of constituent ions of the phosphor is more excellent, particularly, when dispersibility of an activating agent and co-activating agent is more excellent. It is said that also in a luminescent phosphor, afterglow brilliance becomes higher when dispersibility of constituent ions is more excellent.

Further, it is well known that the light emitting property of a phosphor is significantly influenced by a trace impurity. Therefore, for obtaining aluminate which is substrate of a luminescent aluminate-based phosphor, there are used as the main raw material, a high purity aluminum compound powder and the like such as highly purified α-alumina or high purity γ-alumina, high purity aluminum hydroxide and the like.

As the aluminum compound, there is often used alumina such as α-alumina or γ-alumina and the like mainly, and it is known that, if alumina is used, high temperature calcination at 1600° C. or more is required for obtaining a luminescent aluminate-based phosphor in single-phase in which dispersion of constituent ions is excellent. In this case, members of apparatuses such as a calcinations furnace and the like required are limited to expensive materials.

Therefore, for obtaining a luminescent aluminate-based phosphor having excellent light emitting efficiency and afterglow brilliance, it has been desired to produce a luminescent aluminate-based phosphor in which dispersion of constituent ions is more excellent.

SUMMARY OF THE INVENTION

The object of the present invention is to provide a method which can easily produce an aluminate-based phosphor which has excellent light emitting efficiency and in which dispersion of constituent ions is excellent.

Another object of the present invention is to provide a method which can easily produce a luminescent aluminate-based phosphor which has excellent light emitting efficiency and higher afterglow brilliance and in which dispersion of constituent ions is excellent.

Under such conditions, the present inventors have intensively studied and found that a method by which an aluminate-based phosphor in which dispersion of constituent ions is extremely excellent can be produced easily when a specific aluminum compound is used as a raw material.

Further, the present inventors have also found that a method by which a luminescent aluminate-based phosphor in which dispersion of constituent ions is extremely excellent can be produced easily when specific aluminum compound is used as a raw material, and have completed the present invention.

Namely, the present invention provides a method for producing an aluminate-based phosphor comprising calcining an aluminum compound having a BET specific surface area of 100 m²/g or more.

The present invention also provides a method for producing an aluminate-based phosphor comprising the steps of;
mixing an aluminum compound with an organic acid using an organic solvent to obtain a slurry,
mixing the slurry with an aqueous solution of at least one cation selected from the group consisting of Ba, Mg, Eu, Mn, Sr, Ca, Tb, Ce and Zn to obtain a slurry of the mixture,
precipitating the cation in the form of an organic acid salt around the aluminum compound to obtain a precursor,
separating and drying the precursor, and
calcining the precursor at a temperature of from 1000° C. or more to 1700° C. or less, to produce an aluminate-based phosphor.

The present invention further provides a method for producing a luminescent aluminate-based phosphor comprising calcining an aluminum compound having a BET specific surface area of 100 m$^2$/g or more.

The present invention further provides a method for producing a luminescent aluminate-based phosphor comprising the steps of, mixing an aluminum compound with an organic acid using an organic solvent to obtain a slurry, mixing the slurry with an aqueous with an aqueous solution of at least one cation selected from the group consisting of Eu, Dy, Nd, Sr, Ca, Pb, Zn and Bi to obtain a slurry of the mixture, precipitating the cation in the form of an organic acid salt around aluminum hydroxide to obtain a precursor, separating and drying the precursor, and calcining the precursor at a temperature of from 1000° C. or more to 1700° C. or less.

DETAILED DESCRIPTION OF THE INVENTION

In the present invention the aluminum compound used for obtaining a precursor of an aluminate-based phosphor is not particularly restricted providing it is a solid material containing aluminum, and examples thereof include aluminum hydroxide, aluminum oxide, aluminum sulfate and the like.

As the calcinations raw material used for obtaining an aluminate-based phosphor, there is used an aluminum compound having a BET specific surface area of 100 m$^2$/g or more, and aluminum hydroxide or aluminum oxide having a BET specific surface area of 100 m$^2$/g or more is preferable, aluminum hydroxide having a BET specific surface area of 100 m$^2$/g or more is more preferable, aluminum hydroxide having a BET specific surface area of 180 m$^2$/g or more is further preferable and aluminum hydroxide having a BET specific surface area of 200 to 300 m$^2$/g is particularly preferable.

When the BET specific surface area of the aluminum compound is less than 100 m$^2$/g, mixing with other compound is difficult, and an aluminate-based phosphor in which dispersion of constituent ions is excellent is not easily obtained. Further, any aluminum compound may be used providing the BET specific surface area of aluminum hydroxide is less than 100 m$^2$/g, and it is preferable to use aluminum hydroxide, and for example, aluminum hydroxide obtained by hydrolysis of an aluminum alkoxide is more preferable since a BET specific surface area of 100 m$^2$/g or more is easily attainable and flocculation of primary particles is weak.

Preferably, the aluminum hydroxide is an aluminum hydroxide which is capable of forming α-alumina having an alumina purity of 99.9 wt % or more upon heat treatment, since it enhances fluorescent properties such as brilliance and the like. More preferably, the aluminum hydroxide is an aluminum hydroxide obtained by hydrolysis of an aluminum alkoxide and is capable of forming α-alumina having an alumina purity of 99.9 wt % or more upon heat treatment.

As the powdery compound of Ba, Mg, Eu, Mn, Sr, Ca, Ce and Tb constituting an aluminate, there can be used an oxide, or that which is decomposed at higher temperature to become an oxide, such as a hydroxide, carbonate, nitrate, halide, oxalate and the like.

The organic solvent used in mixing an aluminum compound and an organic acid to give a slurry in the present invention may be any organic solvent providing it can disperse the aluminum compound, and examples thereof include alcohols such as methanol, ethanol, isopropanol, propanol, butanol and the like, chloroform, kerosene and the like. Alcohols with which an aluminum compound is dispersed easily are preferable.

As the organic acid, an organic acid having a —COOH group is preferable, and there are exemplified oxalic acid, formic acid, acetic acid, tartaric acid and the like. Particularly when oxalic acid is used, it easily reacts with a cation of Ba, Mg, Eu, Mn, Sr, Ca, Tb, Ce and Zn, and the cation of Ba, Mg, Eu, Mn, Sr, Ca, Tb, Ce and Zn tends to deposit as a oxalate around an aluminum compound, therefore, use of oxalic acid is preferable. The amount of an organic acid used is preferably one-fold or more, more preferably 3-fold or more of the stoichiometric amount necessary for deposition of a cation other than aluminum in the form of an organic acid salt.

As the cation aqueous solution used, an aqueous solution of a chloride of a cation, an aqueous solution of a nitrate of a cation, and the like are listed. As the constituent cation, ions of Ba, Mg and Eu may advantageously be used when a blue phosphor (BaMgAl$_{10}$O$_{17}$:Eu, BaMgAl$_{14}$O$_{23}$:Eu and the like) is produced, and ions of Ba, Mg and Mn may advantageously be used when a green phosphor (BaAl$_{12}$O$_{19}$:Mn, BaMgAl$_{14}$O$_{23}$:Mn and the like) is produced, for example.

The mixing method may be any method, and for example, a mixing method by stirring is preferable since control thereof is easy and cost is low.

The aluminum compound around which at least one cation selected from the group consisting of Ba, Mg, Eu, Mn, Sr, Ca, Tb, Ce and Zn has been deposited is usually separated by solid-liquid separation to give a precursor of an aluminate-based phosphor. The solid-liquid separation method in this procedure may be any method, and there are listed, for example, a method in which filtration and drying are conducted, a method in which granulation is conducted by spray dry, a method in which solid-liquid separation is conducted by evaporation, and the like.

When the aluminate-based phosphor is a compound prepared by adding an activating agent which is at least one metal element selected from the group consisting of Eu and Mn to a composite oxide substrate represented by the general formula x1M1O.y1MgO.z1Al$_2$O$_3$, wherein M1 is at least one metal element selected from the group consisting of Ba, Sr and Ca, it is preferable that mixing is effected so that x1 is 0.5 to 4.5, y1 is 0 to 4, and z1 1 is 0.5 to 20.

For example, when the aluminate-based phosphor is a compound prepared by adding an activating agent which is at least one metal element selected from the group consisting of Eu and Mn to a composite oxide substrate represented by the general formula x11 (Ba, Sr)O.y11 MgO.8Al$_2$O$_3$, wherein x11 is in the range of 0.9 to 1.7 and y11 is in the range of 1.5 to 2.1.

For example, when the aluminate-based phosphor is a compound prepared by adding an activating agent which is at least one metal element selected from the group consisting of Eu and Mn to a composite oxide substrate represented by the general formula x12(Ba, Sr)O.6Al$_2$O$_3$, wherein x12 is in the range of 1.0 to 1.5.

For example, when the aluminate-based phosphor is a compound prepared by adding an activating agent which is at least one metal element selected from the group consisting of Eu and Mn to a composite oxide substrate represented by the general formula x13SrO.7Al$_2$O$_3$, wherein x13 is in the range of 3.9 to 4.1.

When the aluminate-based phosphor is a compound prepared by adding an activating agent which is at least one metal element selected from the group consisting of Tb and Mn to a composite oxide substrate represented by the general formula $x2CeO_{1.5} \cdot y2M2O \cdot 5.5Al_2O_3$, wherein M2 is at least one metal element selected from the group consisting of Mg and Mn, it is preferable that x2 is in the range of 0.9 to 1.1 and y2 is in the range of 0.9 to 1.1.

As the raw material of Eu and Mn which becomes an activating agent for causing light emission, there can be used an oxide, or that which is decomposed at higher temperature to become an oxide, such as a hydroxide, carbonate, nitrate, halide, oxalate and the like.

Regarding the addition amount, for example, when the aluminate-based phosphor is an aluminate-based phosphor prepared by adding an activating agent which is at least one metal element selected from the group consisting of Eu and Mn to a composite oxide substrate represented by the general formula $x11(Ba,Sr)O \cdot 8Al_2O_3$, it is preferable that the addition amount of Eu is in the range of 0.009 to 0.34, and the addition amount of Mn is 0.315 or less.

For example, when the aluminate-based phosphor is an aluminate-based phosphor prepared by adding an activating agent which is at least one metal element selected from the group consisting of Eu and Mn to a composite oxide substrate represented by the general formula $x12(Ba,Sr)O \cdot z12Al_2O_3$, it is preferable that the addition amount of Eu is in the range of $0.01 \times 12$ to $0.15 \times 12$, and the addition amount of Mn is $0.20 \times 12$ or less.

For example, when the aluminate-based phosphor is an aluminate-based phosphor prepared by adding an activating agent which is at least one metal element selected from the group consisting of Eu and Mn to a composite oxide substrate represented by the general formula $x13SrO \cdot z13Al_2O_3$, it is preferable that the addition amount of Eu is in the range of $0.02 \times 13$ to $0.06 \times 13$.

For example, when the aluminate-based phosphor is an aluminate-based phosphor prepared by adding an activating agent which is at least one metal element selected from the group consisting of Tb and Mn to a composite oxide substrate represented by the general formula $x2CeO_{1.5} \cdot y2M2O \cdot z2Al_2O_3$, it is preferable that the addition amount of Tb is in the range of $0.3 \times 2$ to $0.5 \times 2$, and the addition amount of Mn is $0.15y2$ or less.

As the mixing method of these raw materials, any method can be used, and there are exemplified mixings using a ball mill, V shaped mixer, stirring apparatus and the like. Further, for example, a phosphor raw material in which dispersion of constituent cations is extremely excellent can be prepared by using a method in which a slurry obtained by mixing aluminum hydroxide with an organic acid using an organic solvent is mixed with an aqueous solution of at least one cation selected from the group consisting of Ba, Mg, Eu, Mn, Sr, Ca, Tb, Ce and Zn.

Then, the method for calcining a precursor of an aluminate-based phosphor may be any method, and for example, the precursor can be filled in an alumina boat and calcinated at given temperature in given gas atmosphere to obtain phosphors of various colors. Further, if necessary, a phosphor powder having further excellent crystallinity and higher brilliance can be expected to be produced by mixing a reaction promoter (flux) such as boron oxide, aluminum fluoride and the like to the above-mentioned raw materials.

For example, when a precursor of a blue phosphor ($BaMgAl_{10}O_{17}$:Eu, $BaMgAl_{14}O_{23}$:Eu and the like) is calcinated, it is preferable to calcinate the precursor in a reductive atmosphere, at a temperature in the range of 1000 to 1700° C. for 0.5 to 40 hours, once or more. For providing the reductive atmosphere, a method in which a graphite block is place in a boat filled with a precursor, a method in which calcination is conducted an a nitrogen-hydrogen atmosphere or a rare gas.hydrogen atmosphere, and the like are listed. These atmosphere may contain water vapor.

Further, when a precursor of a green phosphor ($BaAl12O_{19}$:Mn, $BaMgAl_{14}O_{23}$:Mn and the like) is calcinated, the precursor is calcinated in a surrounding atmosphere or an oxygen atmosphere, at a temperature in the range of 1000 to 1700° C. for 0.5 to 40 hours, once or more.

Additionally, the aluminate-based phosphor obtained after calcinations may also be subjected to treatment such as dispersion, water-washing, drying, sieving and the like.

The aluminate-based phosphor obtained in the present invention contains particles having a primary particle size of 5 $\mu$m or less in an amount of 80 wt % or more, preferably contains particles having a primary particle size of 5 $\mu$m or more and 5 $\mu$m or less in an amount of 80 wt % or more, the primary particle size being smaller than that of an aluminate-based phosphor obtained by a usual method. As described above, by making the primary particle size of a phosphor smaller and making the particle distribution sharper, it becomes possible, for example, to coat the phosphor efficiently in minute discharge space such as display cells of PDP and the like, and to produce various displays of light emission type such as PDP and the like, manifesting higher emission brilliance.

The aluminate-based phosphor obtained by the present invention has excellent light emitting property under vacuum ultraviolet ray excitation and is extremely useful as an aluminate-based phosphor used in various displays such as a plasma display panel (PDP) and the like, since dispersion of constituent ions in the phosphor is extremely excellent. Further, it has become apparent that the aluminate-based phosphor obtained by the present invention shows excellent light emitting property not only under vacuum ultraviolet ray excitation but also under ultraviolet ray, cathode ray or X-ray excitation. Namely, the present invention provides a method for producing an aluminate-based phosphor which can be excited by energies in wide ranges such as vacuum ultraviolet ray, ultraviolet ray, cathode ray or X-ray and the like, and manifests excellent light emitting property.

More particularly, if the aluminum hydroxide in the present invention is used, it can be expected that dispersed condition of constituent ions other than aluminum becomes more excellent, the crystallinity of the aluminate-based phosphor obtained by the present invention becomes excellent, and chromaticity is enhanced, as compared with the case using other aluminum compound. Further, when the aluminum hydroxide in the present invention is used, flocculated condition of the aluminate-based phosphor primary particles obtained by the present invention becomes weaker as compared with the case using other aluminum compound, and the following processes such as crushing and the like can be simplified.

According to the present invention, an aluminate-based phosphor in which dispersion of constituent ions is extremely excellent can be produced easily, and an aluminate-based phosphor manifesting excellent light emitting efficiency can be provided at low cost. This aluminate-based phosphor is extremely useful in the industrial field as a phosphor used in various displays such as a plasma display panel (PDP) and the like.

Then, the method for producing a luminescent aluminate-based phosphor will be illustrate.

As the aluminum compound used for producing a precursor of a luminescent aluminate-based phosphor in the present invention, the same compounds as described above are listed.

As the calcinations raw materials of a luminescent aluminate-based phosphor, the same compounds as described above are listed.

As the powdery compound of Eu, Dy, Nd, Sr, Ca, Pb, Zn and Bi constituting an aluminate, there can be used an oxide, or that which is decomposed at higher temperature to become an oxide, such as a hydroxide, carbonate, nitrate, halide, oxalate and the like.

When a precursor of an aluminate-based phosphor is used as a calcinations raw material, the organic solvent used in mixing an aluminum compound having a BET specific surface area of 100 m$^2$/g or more and an organic acid to give a slurry may be any organic solvent providing it can disperse aluminum hydroxide, and examples thereof include alcohols such as methanol, ethanol, isopropanol, propanol, butanol and the like, chloroform, kerosene and the like. Alcohols with which aluminum hydroxide is dispersed easily are preferable.

As the organic acid, an organic acid having a —COOH group is preferable, and there are exemplified oxalic acid, formic acid, acetic acid, tartaric acid and the like. Particularly when oxalic acid is used, it easily reacts with a cation of Eu, Dy, Nd, Sr, Ca, Pb, Zn and Bi, and the cation of Eu, Dy, Nd, Sr, Ca, Pb, Zn and Bi tends to deposit as a oxalate around aluminum hydroxide, therefore, use of oxalic acid is preferable. The amount of an organic acid used is preferably one-fold or more, more preferably 3-fold or more of the stoichiometric amount necessary for deposition of a cation other than aluminum in the form of an organic acid salt.

As the cation aqueous solution used, an aqueous solution of a chloride of a cation, an aqueous solution of a nitrate of a cation, and the like are listed. As the constituent cation, ions of Eu, Dy and Sr may advantageously be used when europium, dysprosium-activating strontium aluminate (SrAl2O4:Eu, Dy) is produced.

The mixing method may be any method, and for example, a mixing method by stirring is preferable since control thereof is easy and cost is low.

In the present invention, the aluminum hydroxide around which at least one cation selected from the group consisting of Eu, Dy, Nd, Sr, Ca, Pb, Zn and Bi has been deposited is usually separated by solid-liquid separation to give a precursor of a luminescent aluminate-based phosphor. The solid-liquid separation method in this procedure may be any method, and there are listed, for example, a method in which filtration and drying are conducted, a method in which granulation is conducted by spray dry, a method in which solid-liquid separation is conducted by evaporation, and the like.

When the luminescent aluminate-based phosphor is a compound prepared by adding Eu as an activating agent and further adding at least one metal element selected from the group consisting of Dy and Nd as a co-activating agent to a composite oxide substrate represented by the general formula x1MO.Al$_2$O$_3$, wherein M is Sr or Ca, it is preferable that x1 is in the range of 0.5 to 1.1. Further, the luminescent aluminate-based phosphor may be a compound prepared by further adding at least one metal element selected from the group consisting of Pb, Zn and Bi to a composite oxide substrate represented by the general formula x1MOAl$_2$O$_3$.

For example, when the luminescent aluminate-based phosphor is a compound prepared by adding Eu as an activating agent and further adding Nd as a co-activating agent to a composite oxide substrate represented by the general formula x2CaO.2Al$_2$O$_3$, wherein x2 is in the range of 0.9 to 1.1.

As the raw material of Eu as an activating agent and Dy and Nd as a co-activating agent for causing light emission, there can be used an oxide, or that which is decomposed at higher temperature to become an oxide, such as a hydroxide, carbonate, nitrate, halide, oxalate and the like.

Regarding the addition amount, for example, when the luminescent aluminate-based phosphor is a luminescent, aluminate-based phosphor prepared by adding Eu as an activating agent and Dy as a co-activating agent to a composite oxide substrate represented by the general formula x1SrO.2Al$_2$O$_3$, wherein it is preferable that the addition amount of Eu is in the range of 0.01×1 to 0.1×1, and the addition amount of Dy is in the range of 0.02×1 to 0.2×1.

For example, when the luminescent aluminate-based phosphor is a compound prepared by adding Eu as an activating agent and further adding Nd as a co-activating agent to a composite oxide substrate represented by the general formula x2CaO.z2Al$_2$O$_3$, it is preferable that the addition amount of Eu is in the range of 0.01×2 to 0.1×2, and the addition amount of Nd is in the range of 0.02×2 to 0.2×2.

At least one metal element in the group consisting of La, Ce, Pr, Sm, Gd, Tb, Ho, Er, Tm, Yb, Lu, Mn, Sn and Bi can be added as a co-activating agent to a composite oxide substrate represented by the general formula xMO.zAl$_2$O$_3$, in an amount of 0.001× to 0.1×.

As the mixing method of these raw materials, any method can be used, and there are exemplified mixings using a ball mill, V shaped mixer, stirring apparatus and the like. Further, for example, a phosphor raw material in which dispersion of constituent cations is extremely excellent can be prepared by using a method in which a slurry obtained by mixing aluminum hydroxide with an organic acid using an organic solvent is mixed with an aqueous solution of at least one cation selected from the group consisting of Eu, Dy, Nd, Sr, Ca, Pb, Zn and Bi.

As the method for calcining a precursor of a luminescent aluminate-based phosphor, the same methods as described above are listed.

The luminescent aluminate-based phosphor obtained in the present invention contains particles having a primary particle size of 5 µm or less in an amount of 80 wt % or more, the primary particle size being smaller than that of a luminescent aluminate-based phosphor obtained by a usual method. As described above, by making the primary particle size of a phosphor smaller and making the particle distribution sharper, it becomes possible to disperse a phosphor efficiently in making paste, and to produce a resin composition having high emission brilliance.

More specifically, when the aluminum hydroxide in the present invention is used, it can be expected that dispersed condition of constituent ions other than aluminum becomes more excellent, the crystallinity of the aluminate-based phosphor becomes excellent, and afterglow property is enhanced, as compared with the case using other aluminum compound. Further, when the aluminum hydroxide in the present invention is used, flocculated condition of the luminous material primary particles becomes weaker as compared with the case using other aluminum compound, and the following processes such as crushing and the like can be simplified.

The luminescent, aluminate-based phosphor obtained in the present invention has excellent afterglow property and is extremely useful as a luminous material since dispersion of constituent ions in the phosphor is extremely excellent.

According to the present invention, a luminescent aluminate-based phosphor in which dispersion of constituent ions is extremely excellent can be produced easily, and a luminescent aluminate-based phosphor manifesting excellent light emitting efficiency and longer life can be provided at low cost. This luminescent aluminate-based phosphor is extremely useful in the industrial field.

EXAMPLE

The following examples will illustrate the present invention further in detail below, but do not limit the scope of the present invention.

Example 1

4.91 g of aluminum hydroxide (BET specific surface area: 250 m$^2$/g), 1.26 g barium carbonate, 0.12 g of europium oxide and 0.69 g of basic magnesium carbonate were mixed sufficiently in a ball mill, and the resulted precursor was calcinated for 2 hours at 1450° C. in a weak reductive atmosphere to obtain a blue phosphor. Evaluation by a scanning electric microscope revealed that the primary particle size of the resulted blue phosphor was 1 μm or less. Further, XRD evaluation (phase identification evaluation by minute X-ray diffraction apparatus: Ru-200 manufactured by Rigaku) revealed BaMgAl$_{10}$O$_{17}$:Eu single phase.

Example 2

8.47 g of aluminum hydroxide (BET specific surface area: 250 m$^2$/g) obtained by a hydrolysis reaction of aluminum isopropoxide was dispersed in 100 g of isopropanol, and to this was added 210 g of isopropanol into which 10 g of oxalic acid had been dissolved while stirring, to prepare Slurry A.

2.69 g of barium chloride dihydrate, 0.45 g of europium chloride hexahydrate and 2.49 g of magnesium chloride hexahydrate were dissolved in 20 g of purified water to prepare a mixed aqueous solution of a barium ion, europium ion and magnesium ion.

The mixed aqueous solution was added to stirred Slurry A to cause precipitation of barium, europium and magnesium in the form of oxalates around aluminum hydroxide, and solid-liquid separation was conducted by evaporation to prepare a precursor.

The resulted precursor was calcinated for 2 hours at 1450° C. in a weak reductive atmosphere to obtain a blue phosphor. Evaluation by a scanning electric microscope revealed that the primary particle size of the resulted blue phosphor was 1 μm or less. Further, XRD evaluation (the same as above) revealed BaMgAl$_{10}$O$_{17}$:Eu single phase.

This blue phosphor was irradiated with an ultraviolet ray using an Excimer 146 nm lamp (manufactured by Ushio Inc.) in a vacuum chamber of 6.7 Pa (5×10$^{-2}$ Torr) or less to show blue strong emission which was measured by a brilliance meter (BM-7, manufactured by TOPCON) to find a light emission brilliance of 25.05 cd/m$^2$, being stronger than that of a conventional article. Also when this phosphor was excited by an ultraviolet ray, cathode ray or X-ray of 254 nm or 365 nm, blue light emission of high brilliance was shown.

Example 3

A blue phosphor was obtained in the same manner as in Example 1 except that 8.47 g of aluminum hydroxide was replaced by 6.2 g of alumina. Evaluation by a scanning electric microscope revealed that the primary particle sizes of the resulted blue phosphors were all 0.05 μm or more and 1 μm or less.

This blue phosphor was irradiated with an ultraviolet ray using an Excimer 146 nm lamp (manufactured by Ushio Inc.) in a vacuum chamber of 6.7 Pa (5×10$^{-2}$ Torr) or less to show blue strong emission which was measured by a brilliance meter (BM-7, manufactured by TOPCON) to find a light emission brilliance of 28.09 cd/M$^2$, being stronger than that of a conventional article. Also when this phosphor was excited by an ultraviolet ray, cathode ray or X-ray of 254 nm or 365 nm, blue light emission of high brilliance was shown. Further, the X ray diffraction was measured in the same manner as in Example 1, and it was found that the resulted phosphor had BaMgAl$_{10}$O$_{17}$:Eu single phase.

Example 4

6.71 g of aluminum hydroxide (BET specific surface area: 250 m$^2$/g) obtained by a hydrolysis reaction of aluminum isopropoxide, 13.73 g of strontium carbonate, 0.35 g of europium oxide and 0.90 g of dysprosium oxide were mixed sufficiently in a ball mill, and the mixture was calcinated for 3 hours at 1300° C. in a weak reductive atmosphere to obtain (Sr 0.93, Eu 0.02, Dy 0.05)O.Al$_2$O$_3$. The resulted (Sr 0.93, Eu 0.02, Dy 0.05)O.Al$_2$O$_3$ revealed high afterglow brilliance of yellow green color.

Example 5

6.71 g of aluminum hydroxide (BET specific surface area: 250 m$^2$/g) obtained by a hydrolysis reaction of aluminum isopropoxide was dispersed in 100 g of isopropanol, and to this was added 210 g of isopropanol into which 10 g of oxalic acid had been dissolved while stirring to prepare Slurry A.

Then, strontium chloride hexahydrate, europium chloride hexahydrate and dysprosium chloride were dissolved in 20 g of purified water in respective given amounts to prepare a mixed aqueous solution of a strontium ion, europium ion and dysprosium ion.

Subsequently, the mixed aqueous solution was added to stirred Slurry A to cause precipitation of strontium, europium and dysprosium in the form of oxalates around aluminum hydroxide, and solid-liquid separation was conducted by evaporation to prepare a precursor of a luminescent phosphor.

The resulted precursor was calcinated for 3 hours at 1300° C. in a weak reductive atmosphere to obtain (Sr 0.93, Eu 0.02, Dy 0.05)O.Al$_2$O$_3$. The resulted (Sr 0.93, Eu 0.02, Dy 0.05)O.Al$_2$O$_3$ revealed high afterglow brilliance of yellow green color.

What is claimed is:

1. A method for producing an aluminate-based phosphor comprising mixing an aluminum compound and a metal compound and calcining the mixture, wherein the aluminum compound has a BET specific surface area of 100 m$^2$/g or more and the aluminate-based phosphor comprises the metal of the metal compound.

2. A method for producing an aluminate-based phosphor comprising the steps of;
   mixing an aluminum compound with an organic acid using an organic solvent to obtain a slurry,
   mixing the slurry with an aqueous solution of at least one cation selected from the group consisting of Ba, Mg, Eu, Mn, Sr, Ca, Tb, Ce and Zn to obtain a slurry of the mixture, precipitating the cation in the form of an organic acid salt around the aluminum compound to obtain a precursor, separating and drying the precursor, and calcining the precursor at a temperature of from 1000° C. or more to 1700° C. or less, to produce an aluminate-based phosphor.

3. The method according to claim 2, wherein the aluminum compound is a compound having a BET specific surface area of 100 $m^2/g$ or more.

4. The method according to claim 3, wherein the aluminum compound is aluminum hydroxide or aluminum oxide.

5. The method according to claim 3, wherein the aluminum compound is aluminum hydroxide.

6. The method according to claim 3, wherein the aluminum compound is aluminum hydroxide obtained by hydrolysis of an aluminum alkoxide.

7. The method according to claim 3, wherein the aluminum compound is an aluminum hydroxide which capable of forming α-alumina having a purity of 99.9 wt % or more upon heat treatment.

8. The method according to claim 2, wherein the organic acid is at least one selected from the group consisting of oxalic acid, acetic acid and tartaric acid.

9. The method according to claim 1, wherein the aluminate-based phosphor is a compound prepared by adding an activating agent which is at least one metal element selected from the group consisting of Eu and Mn to a composite oxide substrate represented by the general formula $x1M1O \cdot y1MgO \cdot z1Al_2O_3$, M1 is at least one metal element selected from the group consisting of Ba, Sr and Ca, x1 is 0.5 to 4.5, y1 is 0 to 4, and z1 is 0.5 to 20.

10. The method according to claim 2, wherein the aluminate-based phosphor is a compound prepared by adding an activating agent which is at least one metal element selected from the group consisting of Eu and Mn to a composite oxide substrate represented by the general formula $x1M1O \cdot y1MgO \ z1Al_2O_3$, M1 is at least one metal element selected from the group consisting of Ba, Sr and Ca, x1 is 0.5 to 4.5, y1 is 0 to 4, and z1 is 0.5 to 20.

11. The method according to claim 1, wherein the aluminate-based phosphor is a compound prepared by adding an activating agent which is at least one metal element selected from the group consisting of Tb and Mn to a composite oxide substrate represented by the general formula $x2CeO_{1.5} \cdot y2M2O \cdot 5.5Al_2O_3$, wherein M2 is at least one metal element selected from the group consisting of Mg and Mn, x2 is 0.9 to 1.1 and y2 is 0.9 to 1.1.

12. The method according to claim 2, wherein the aluminate-based phosphor is a compound prepared by adding an activating agent which is at least one metal element selected from the group consisting of Tb and Mn to a composite oxide substrate represented by the general formula $x2CeO_{1.5} \cdot y2M2O \cdot 5.5Al_2O_3$, wherein M2 is at least one metal element selected from the group consisting of Mg and Mn, x2 is 0.9 to 1.1 and y2 is 0.9 to 1.1.

13. A method for producing a luminescent aluminate-based phosphor comprising mixing an aluminum compound and a metal compound and calcining the mixture, wherein the aluminum compound has a BET specific surface area of 100 $m^2/g$ or more and the luminescent aluminate-based phosphor comprises the metal of the metal compound and wherein the luminescent aluminate-based phosphor has an afterglow brilliance.

14. A method for producing a luminescent aluminate-based phosphor comprising the steps of;

mixing an aluminum compound with an organic acid using an organic solvent to obtain a slurry, mixing the slurry with an aqueous solution of at least one cation selected from the group consisting of Eu, Dy, Nd, Sr, Ca, Pb, Zn and Bi to obtain a slurry of the mixture, precipitating the cation in the form of an organic acid salt around the aluminum compound to obtain a precursor, separating and drying the precursor, and calcining the precursor at a temperature of from 1000° C. or more to 1700° C. or less, to produce an aluminate-based phosphor.

15. A method according to claim 14, wherein the aluminum compound is a compound having a BET specific surface area of 100 $m^2/g$ or more.

16. The method according to claim 15, wherein the aluminum compound is aluminum hydroxide or aluminum oxide.

17. The method according to claim 15, wherein the aluminum compound is aluminum hydroxide.

18. The method according to claim 15, wherein the aluminum compound is aluminum hydroxide obtained by hydrolysis of an aluminum alkoxide.

19. The method according to claim 15, wherein the aluminum compound is an aluminum hydroxide which capable of forming α-alumina having a purity of 99.9 wt % or more upon heat treatment.

20. The method according to claim 14, wherein the organic acid is at least one selected from the group consisting of oxalic acid, acetic acid and tartaric acid.

21. The method according to claim 13, wherein the long persistent aluminate-based phosphor is a compound prepared by adding Eu as an activating agent and further adding at least one metal element selected from the group consisting of Dy and Nd as a co-activating agent to a composite oxide substrate represented by the general formula $x1MO \cdot Al_2O_3$, wherein M is Sr or Ca and x1 is 0.5 to 1.1.

22. The method according to claim 14, wherein the luminescent aluminate-based phosphor is a compound prepared by adding Eu as an activating agent and further adding at least one metal element selected from the group consisting of Dy and Nd as a co-activating agent to a composite oxide substrate represented by the general formula $x1MO \cdot Al_2O_3$, wherein M is Sr or Ca and x1 is 0.5 to 1.1.

23. The method according to claim 20, wherein the luminescent aluminate-based phosphor is a compound prepared by further adding at least one metal element selected from the group consisting of Pb, Zn and Bi to a composite oxide substrate represented by the general formula $x1MO \cdot Al_2O_3$.

* * * * *